(12) United States Patent
Carobolante et al.

(10) Patent No.: US 9,401,622 B2
(45) Date of Patent: Jul. 26, 2016

(54) SYSTEMS AND METHODS FOR EXTENDING THE POWER CAPABILITY OF A WIRELESS CHARGER

(71) Applicant: QUALCOMM Incorporated, San Diego, CA (US)

(72) Inventors: Francesco Carobolante, Carlsbad, CA (US); Joseph Najib Maalouf, San Diego, CA (US); Sumukh Ashok Shevde, Carlsbad, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 136 days.

(21) Appl. No.: 14/259,012

(22) Filed: Apr. 22, 2014

(65) Prior Publication Data
US 2015/0028801 A1    Jan. 29, 2015

Related U.S. Application Data

(60) Provisional application No. 61/857,603, filed on Jul. 23, 2013.

(51) Int. Cl.
| | |
|---|---|
| *H02J 7/00* | (2006.01) |
| *H02J 7/02* | (2016.01) |
| *H02J 7/34* | (2006.01) |

(52) U.S. Cl.
CPC . *H02J 7/025* (2013.01); *H02J 7/00* (2013.01); *H02J 7/34* (2013.01)

(58) Field of Classification Search
CPC ............... H02J 7/00; H02J 7/025; H02J 7/34
USPC .......................... 320/108, 109, 113, 114, 115
See application file for complete search history.

(56) References Cited

U.S. PATENT DOCUMENTS

| | | | |
|---|---|---|---|
| 8,093,745 B2* | 1/2012 | Cern | G01R 23/06 307/104 |
| 9,178,378 B2* | 11/2015 | Yoon | H05K 1/165 |

(Continued)

FOREIGN PATENT DOCUMENTS

| | | |
|---|---|---|
| EP | 2333932 A1 | 6/2011 |
| WO | WO-2010093969 A2 | 8/2010 |
| WO | WO-2013048053 A1 | 4/2013 |

OTHER PUBLICATIONS

International Search Report and Written Opinion—PCT/US2014/047051—ISA/EPO—Dec. 2, 2014.

(Continued)

*Primary Examiner* — Phallaka Kik
(74) *Attorney, Agent, or Firm* — Knobbe, Martens, Olson & Bear LLP

(57) ABSTRACT

Systems and methods for converting voltages between different voltage levels in a receiver are disclosed. In an aspect, a wireless power receiver apparatus for charging a chargeable device is provided. The wireless power receiver apparatus for charging a chargeable device can include a receive antenna configured to wirelessly receive power at a level sufficient for charging the chargeable device. The wireless power receiver apparatus can also include converter circuitry. The converter circuitry can be coupled to the receive antenna. The converter circuitry can be configured to receive an input voltage derived from the wirelessly received power. The converter circuitry can also be configured to produce an output voltage that is scaled to a value relative to the input voltage based on a relationship between the input voltage and a first voltage level threshold.

30 Claims, 9 Drawing Sheets

(56) References Cited

U.S. PATENT DOCUMENTS

| | | | |
|---|---|---|---|
| 9,231,428 B2* | 1/2016 | Yoon | H02J 7/025 |
| 2005/0237825 A1* | 10/2005 | Kawajiri | G11C 16/12 |
| | | | 365/189.11 |
| 2007/0120421 A1* | 5/2007 | Boys | H02J 5/005 |
| | | | 307/11 |
| 2007/0279002 A1 | 12/2007 | Partovi et al. | |
| 2009/0067208 A1* | 3/2009 | Martin | H02J 17/00 |
| | | | 363/126 |
| 2010/0181964 A1 | 7/2010 | Huggins et al. | |
| 2010/0231340 A1 | 9/2010 | Fiorello et al. | |
| 2011/0050164 A1 | 3/2011 | Partovi et al. | |
| 2011/0086256 A1* | 4/2011 | Julstrom | H01F 38/14 |
| | | | 429/121 |
| 2011/0291613 A1* | 12/2011 | Rosik | H01M 10/443 |
| | | | 320/108 |
| 2011/0316475 A1* | 12/2011 | Jung | H04B 5/0037 |
| | | | 320/108 |
| 2012/0088555 A1 | 4/2012 | Hu | |
| 2012/0153903 A1* | 6/2012 | Kim | H02H 7/1252 |
| | | | 320/148 |
| 2012/0280650 A1 | 11/2012 | Kim et al. | |
| 2013/0002038 A1 | 1/2013 | Lee et al. | |
| 2013/0043734 A1 | 2/2013 | Stone et al. | |
| 2013/0099585 A1 | 4/2013 | Von Novak et al. | |
| 2013/0099735 A1 | 4/2013 | Partovi | |
| 2013/0119929 A1 | 5/2013 | Partovi | |
| 2013/0181539 A1* | 7/2013 | Muratov | H01F 38/14 |
| | | | 307/104 |
| 2013/0214611 A1* | 8/2013 | Bae | H02M 7/06 |
| | | | 307/104 |
| 2013/0234658 A1* | 9/2013 | Endo | H02J 7/025 |
| | | | 320/108 |
| 2013/0307344 A1 | 11/2013 | Cheon et al. | |
| 2014/0055078 A1 | 2/2014 | Jing | |
| 2014/0266010 A1* | 9/2014 | Newlin | H02J 7/0052 |
| | | | 320/107 |
| 2014/0266019 A1* | 9/2014 | Pigott | H02J 7/025 |
| | | | 320/108 |
| 2015/0028803 A1* | 1/2015 | Shevde | H02J 7/025 |
| | | | 320/108 |
| 2015/0222130 A1* | 8/2015 | Goma | H02J 17/00 |
| | | | 307/104 |
| 2015/0244176 A1* | 8/2015 | Van Den Brink | H02J 5/005 |
| | | | 307/104 |

OTHER PUBLICATIONS

Ng V.W., et al., "Switched Capacitor DC-DC Converter: Superior where the Buck Converter has Dominated," Technical Report No. UCB/EECS-2011-94, Aug. 17, 2011, 141 pages.

* cited by examiner

SYSTEMS AND METHODS FOR EXTENDING THE POWER CAPABILITY OF A WIRELESS CHARGER

CROSS-REFERENCE TO RELATED APPLICATIONS

The present application claims priority to provisional U.S. Application Ser. No. 61/857,603, entitled "Systems and Methods for Extending the Power Capability of a Wireless Charger," filed Jul. 23, 2013, assigned to the assignee hereof and incorporated herein by reference in its entirety.

FIELD

The present application relates generally to wireless power. More specifically, the disclosure is directed to transmitters and receivers in a wireless power transfer system.

BACKGROUND

An increasing number and variety of electronic devices are powered via rechargeable batteries. Such devices include mobile phones, portable music players, laptop computers, tablet computers, computer peripheral devices, communication devices (e.g., Bluetooth devices), digital cameras, hearing aids, and the like. While battery technology has improved, battery-powered electronic devices increasingly require and consume greater amounts of power, thereby often requiring recharging. Rechargeable devices are often charged via wired connections through cables or other similar connectors that are physically connected to a power supply. Cables and similar connectors may sometimes be inconvenient or cumbersome and have other drawbacks. Wireless charging systems that are capable of transferring power in free space to be used to charge rechargeable electronic devices or provide power to electronic devices may overcome some of the deficiencies of wired charging solutions. As such, wireless power transfer systems and methods that efficiently and safely transfer power to electronic devices are desirable.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

In a particular embodiment, a wireless power receiver apparatus for charging a chargeable device is provided. The wireless power receiver apparatus for charging a chargeable device can include a receive antenna configured to wirelessly receive power at a level sufficient for charging the chargeable device. The wireless power receiver apparatus can also include converter circuitry. The converter circuitry can be coupled to the receive antenna. The converter circuitry can be configured to receive an input voltage derived from the wirelessly received power. The converter circuitry can also be configured to produce an output voltage that is scaled to a value relative to the input voltage based on a relationship between the input voltage and a first voltage level threshold.

In another particular embodiment, a wireless power receiver apparatus for charging a chargeable device is provided. The wireless power receiver apparatus for charging a chargeable device can include means for wirelessly receiving power at a level sufficient for charging the chargeable device. The wireless power receiver apparatus for charging a chargeable device can also include means for receiving an input voltage derived from the wirelessly received power coupled to the means for wirelessly receiving power. The wireless power receiver apparatus for charging a chargeable device can also include means for producing an output voltage from the means for receiving an input voltage that is scaled to a value relative to the input voltage based on a relationship between the input voltage and a first voltage level threshold.

In another particular embodiment, a method for charging a chargeable device can include wirelessly receiving power at a level sufficient for charging the chargeable device at a receive antenna. The method can also include receiving an input voltage derived from the wirelessly received power at converter circuitry coupled to the receive antenna. The method can also include producing an output voltage from the converter circuitry that is scaled to a value relative to the input voltage based on a relationship between the input voltage and a first voltage level threshold.

DETAILED DESCRIPTION

The detailed description set forth below in connection with the appended drawings is intended as a description of exemplary embodiments and is not intended to represent the only embodiments which may be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments. In some instances, some devices are shown in block diagram form.

Wirelessly transferring power may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receiving antenna" to achieve power transfer. It will be understood that, throughout this specification, two components being "coupled" may refer to their interaction through direct or indirect ways, and may further refer to a physically connected (e.g. wired) coupling or a physically disconnected (e.g. wireless) coupling.

Figure 1:
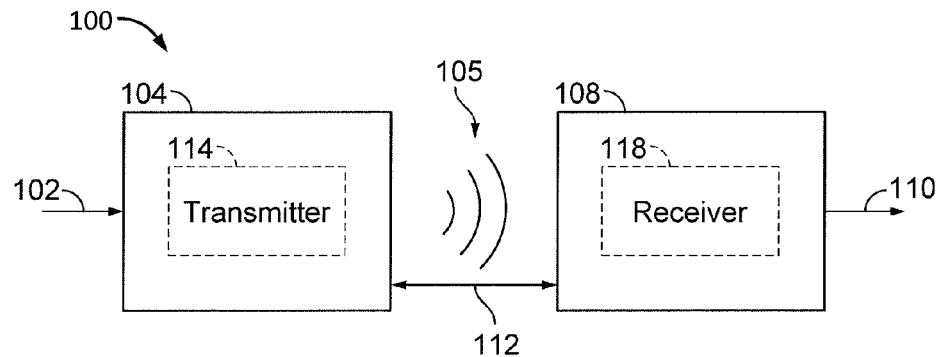
FIG. 1 is a functional block diagram of an exemplary wireless power transfer system, in accordance with an exemplary embodiment.

FIG. 1 is a functional block diagram of an exemplary wireless power transfer system 100, in accordance with exemplary embodiments. Input power 102 may be provided to a transmitter 104 from a power source (not shown) for generating a field 105 for providing energy transfer. A receiver 108 may couple to the field 105 and generate output power 110 for storing or consumption by a device (not shown) coupled to the output power 110. Both the transmitter 104 and the receiver 108 are separated by a distance 112. In one exemplary embodiment, transmitter 104 and receiver 108 are configured according to a mutual resonant relationship. When the resonant frequency of receiver 108 and the resonant frequency of transmitter 104 are substantially the same or very close, transmission losses between the transmitter 104 and the receiver 108 are minimal. As such, wireless power transfer may be provided over larger distance in contrast to purely inductive solutions that may require large coils to be very close (e.g., mms). Resonant inductive coupling techniques may thus allow for improved efficiency and power transfer over various distances and with a variety of inductive coil configurations.

The receiver 108 may receive power when the receiver 108 is located in an energy field 105 produced by the transmitter 104. The field 105 corresponds to a region where energy output by the transmitter 104 may be captured by a receiver 105. In some cases, the field 105 may correspond to the "near-field" of the transmitter 104 as will be further described below. The transmitter 104 may include a transmit antenna 114 (e.g., a transmit coil) for outputting an energy transmission. The receiver 108 further includes a receive antenna 118 (e.g., a receive coil) for receiving or capturing energy from the energy transmission. The near-field may correspond to a region in which there are strong reactive fields resulting from the currents and charges in the transmit antenna 114 that minimally radiate power away from the transmit antenna 114. In some cases the near-field may correspond to a region that is within about one wavelength (or a fraction thereof) of the transmit antenna 114. The transmit and receive antennas 114 and 118 are sized according to applications and devices to be associated therewith. As described above, efficient energy transfer may occur by coupling a large portion of the energy in a field 105 of the transmit antenna 114 to a receive antenna 118 rather than propagating most of the energy in an electromagnetic wave to the far field. When positioned within the field 105, a "coupling mode" may be developed between the transmit antenna 114 and the receive antenna 118. The area around the transmit and receive antennas 114 and 118 where this coupling may occur is referred to herein as a coupling-mode region.

Figure 2:
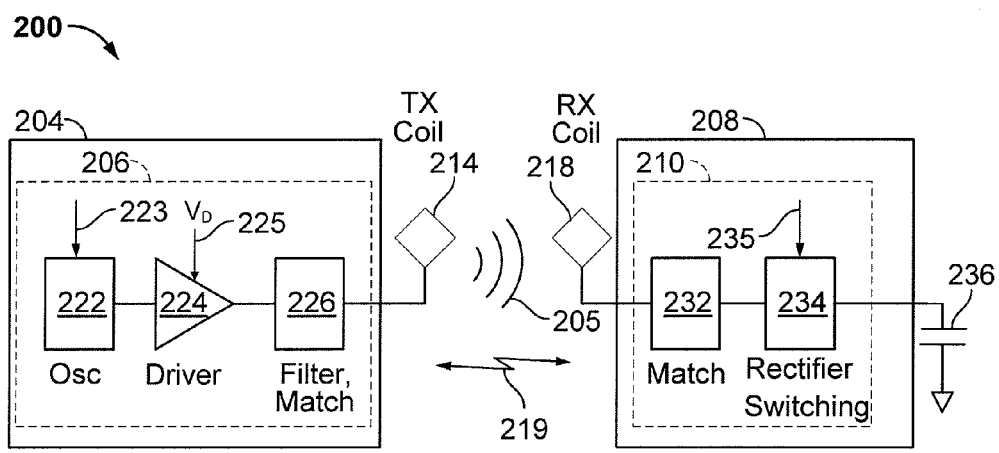
FIG. 2 is a functional block diagram of exemplary components that may be used in the wireless power transfer system of FIG. 1, in accordance with an exemplary embodiment.

FIG. 2 is a functional block diagram of exemplary components that may be used in the wireless power transfer system 100 of FIG. 1, in in accordance with an exemplary embodiment. The transmitter 204 may include transmit circuitry 206 that may include an oscillator 222, a driver circuit 224, and a filter and matching circuit 226. The oscillator 222 may be configured to generate a signal at a desired frequency, such as 468.75 KHz, 6.78 MHz or 13.56 MHz, that may be adjusted in response to a frequency control signal 223. The oscillator signal may be provided to a driver circuit 224 configured to drive the transmit antenna 214 at, for example, a resonant frequency of the transmit antenna 214. The driver circuit 224 may be a switching amplifier configured to receive a square wave from the oscillator 222 and output a sine wave. For example, the driver circuit 224 may be a class E amplifier. A filter and matching circuit 226 may be also included to filter out harmonics or other unwanted frequencies and match the impedance of the transmitter 204 to the transmit antenna 214. As a result of driving the transmit antenna 214, the transmitter 204 may wirelessly output power at a level sufficient for charging or powering an electronic device. As one example, the power provided may be for example on the order of 300 milliWatts to 5 Watts to power or charge different devices with different power requirements. Higher or lower power levels may also be provided.

The receiver 208 may include receive circuitry 210 that may include a matching circuit 232 and a rectifier and switching circuit 234 to generate a DC power output from an AC power input to charge a battery 236 as shown in FIG. 2 or to power a device (not shown) coupled to the receiver 108. The matching circuit 232 may be included to match the impedance of the receive circuitry 210 to the receive antenna 218. The receiver 208 and transmitter 204 may additionally communicate on a separate communication channel 219 (e.g., Bluetooth, zigbee, cellular, etc). The receiver 208 and transmitter 204 may alternatively communicate via in-band signaling using characteristics of the wireless field 206.

As described more fully below, receiver 208, that may initially have a selectively disabled associated load (e.g., battery 236), may be configured to determine whether an amount of power transmitted by transmitter 204 and received by receiver 208 is appropriate for charging a battery 236. Further, receiver 208 may be configured to enable a load (e.g., battery 236) upon determining that the amount of power is appropriate. In some embodiments, a receiver 208 may be configured to directly utilize power received from a wireless power transfer field without charging of a battery 236. For example, a communication device, such as a near-field communication (NFC) or radio-frequency identification device (RFID may be configured to receive power from a wireless power transfer field and communicate by interacting with the wireless power transfer field and/or utilize the received power to communicate with a transmitter 204 or other devices.

Figure 3:
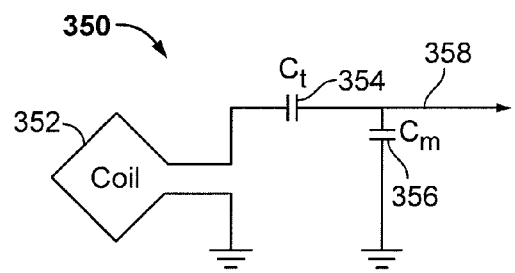
FIG. 3 is a schematic diagram of a portion of transmit circuitry or receive circuitry of FIG. 2 including a transmit or receive antenna, in accordance with an exemplary embodiment.

FIG. 3 is a schematic diagram of a portion of transmit circuitry 206 or receive circuitry 210 of FIG. 2 including a transmit or receive antenna 352, in accordance with an exemplary embodiment. As illustrated in FIG. 3, transmit or receive circuitry 350 used in exemplary embodiments including those described below may include an antenna 352. The antenna 352 may also be referred to or be configured as a "loop" antenna 352. The antenna 352 may also be referred to herein or be configured as a "magnetic" antenna or an induction coil. The term "antenna" generally refers to a component that may wirelessly output or receive energy from coupling to another "antenna." The antenna may also be referred to as a coil of a type that is configured to wirelessly output or receive power. As used herein, an antenna 352 is an example of a "power transfer component" of a type that is configured to wirelessly output and/or receive power. The antenna 352 may be configured to include an air core or a physical core such as a ferrite core (not shown). An air core loop antenna 352 allows the placement of other components within the core area. In addition, an air core loop may more readily enable placement of the receive antenna 218 (FIG. 2) within a plane of the transmit antenna 214 (FIG. 2) where the coupled-mode region of the transmit antenna 214 (FIG. 2) may be more powerful.

As stated, efficient transfer of energy between the transmitter 104 and receiver 108 may occur during matched or nearly matched resonance between the transmitter 104 and the receiver 108. However, even when resonance between the transmitter 104 and receiver 108 are not matched, energy may be transferred, although the efficiency may be affected. Transfer of energy occurs by coupling energy from the field 205 of the transmit antenna 214 coil to the receive antenna 218 residing in the neighborhood where this field 205 is established rather than propagating the energy from the transmit antenna 214 into free space.

The resonant frequency of the loop or magnetic antennas is based on the inductance and capacitance. Inductance may be simply the inductance created by the antenna 352, whereas, capacitance may be added to the antenna's inductance to create a resonant structure at a desired resonant frequency. As a non-limiting example, capacitor 352 and capacitor 354 may be added to the transmit or receive circuitry 350 to create a resonant circuit that selects a signal 356 at a resonant frequency. Accordingly, for larger diameter antennas, the size of capacitance needed to sustain resonance may decrease as the diameter or inductance of the loop increases. Furthermore, as the diameter of the antenna increases, the efficient energy transfer area of the near-field may increase. Other resonant circuits formed using other components are also possible. As another non-limiting example, a capacitor may be placed in parallel between the two terminals of the antenna 352. For transmit antennas, a signal 358 with a frequency that substantially corresponds to the resonant frequency of the antenna 352 may be an input to the antenna 352.

In one embodiment, the transmitter 104 may be configured to output a time varying magnetic field with a frequency corresponding to the resonant frequency of the transmit antenna 114. When the receiver is within the field 105, the time varying magnetic field may induce a current in the receive antenna 118. As described above, if the receive antenna 118 is configured to be resonant at the frequency of the transmit antenna 118, energy may be efficiently transferred. The AC signal induced in the receive antenna 118 may be rectified as described above to produce a DC signal that may be provided to charge or to power a load.

Figure 4:
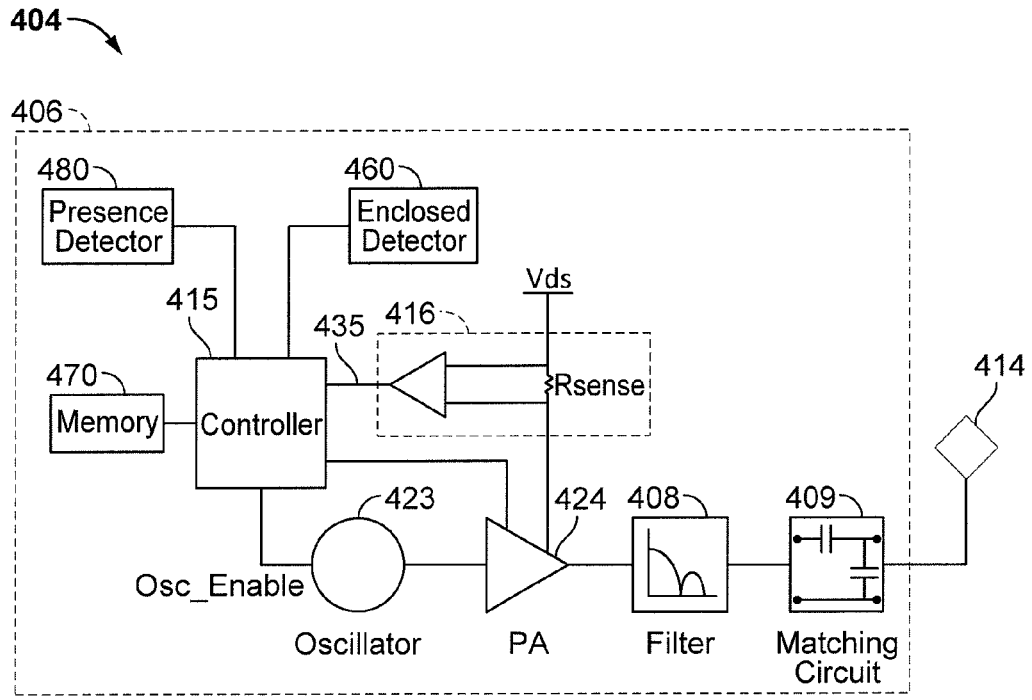
FIG. 4 is a functional block diagram of a transmitter that may be used in the wireless power transfer system of FIG. 1, in accordance with an exemplary embodiment.

FIG. 4 is a functional block diagram of a transmitter 404 that may be used in the wireless power transfer system of FIG. 1, in accordance with an exemplary embodiment. The transmitter 404 may include transmit circuitry 406 and a transmit antenna 414. The transmit antenna 414 may be the antenna 352 as shown in FIG. 3. Transmit circuitry 406 may provide RF power to the transmit antenna 414 by providing an oscillating signal resulting in generation of energy (e.g., magnetic flux) about the transmit antenna 414. Transmitter 404 may operate at any suitable frequency. By way of example, transmitter 404 may operate at the 6.78 MHz ISM band.

Transmit circuitry 406 may include a fixed impedance matching circuit 409 for matching the impedance of the transmit circuitry 406 (e.g., 50 ohms) to the transmit antenna 414 and a low pass filter (LPF) 408 configured to reduce harmonic emissions to levels to prevent self-jamming of devices coupled to receivers 108 (FIG. 1). Other exemplary embodiments may include different filter topologies, including but not limited to, notch filters that attenuate specific frequencies while passing others and may include an adaptive impedance match, that may be varied based on measurable transmit metrics, such as output power to the antenna 414 or DC current drawn by the driver circuit 424. Transmit circuitry 406 further includes a driver circuit 424 configured to drive an RF signal as determined by an oscillator 423. The transmit circuitry 406 may be comprised of discrete devices or circuits, or alternately, may be comprised of an integrated assembly. An exemplary RF power output from transmit antenna 414 may be on the order of 2.5 Watts.

Transmit circuitry 406 may further include a controller 415 for selectively enabling the oscillator 423 during transmit phases (or duty cycles) for specific receivers, for adjusting the frequency or phase of the oscillator 423, and for adjusting the output power level for implementing a communication protocol for interacting with neighboring devices through their attached receivers. It is noted that the controller 415 may also be referred to herein as processor 415. Adjustment of oscillator phase and related circuitry in the transmission path may allow for proper control of the system.

The transmit circuitry 406 may further include a load sensing circuit 416 for detecting the presence or absence of active receivers in the vicinity of the near-field generated by transmit antenna 414. By way of example, a load sensing circuit 416 monitors the current flowing to the driver circuit 424, that may be affected by the presence or absence of active receivers in the vicinity of the field generated by transmit antenna 414 as will be further described below. Detection of changes to the loading on the driver circuit 424 are monitored by controller 415 for use in determining whether to enable the oscillator 423 for transmitting energy and to communicate with an active receiver. As described more fully below, a current measured at the driver circuit 424 may be used to determine whether an invalid device is positioned within a wireless power transfer region of the transmitter 404.

The transmit antenna 414 may be implemented with a Litz wire or as an antenna strip with the thickness, width and metal type selected to keep resistive losses low. In one implementation, the transmit antenna 414 may generally be configured for association with a larger structure such as a table, mat, lamp or other less portable configuration. Accordingly, the transmit antenna 414 generally may not need "turns" in order to be of a practical dimension. An exemplary implementation of a transmit antenna 414 may be "electrically small" (i.e., fraction of the wavelength) and tuned to resonate at lower usable frequencies by using capacitors to define the resonant frequency.

The transmitter 404 may gather and track information about the whereabouts and status of receivers that may be associated with the transmitter 404. Thus, the transmit circuitry 406 may include a presence detector 480, an enclosed detector 460, or a combination thereof, connected to the controller 415 (also referred to as a processor herein). The controller 415 may adjust an amount of power delivered by the driver circuit 424 in response to presence signals from the presence detector 480 and the enclosed detector 460. The transmitter 404 may receive power through a number of power sources, such as, for example, an AC-DC voltage converter (not shown) to convert conventional AC power present in a building, a DC-DC voltage converter (not shown) to convert a conventional DC power source to a voltage suitable for the transmitter 404, or directly from a conventional DC power source (not shown).

As a non-limiting example, the presence detector 480 may be a motion detector utilized to sense the initial presence of a device to be charged that is inserted into the coverage area of the transmitter 404. After detection, the transmitter 404 may be turned on and the RF power received by the device may be used to toggle a switch on the Rx device in a pre-determined manner, which in turn results in changes to the driving point impedance of the transmitter 404.

As another non-limiting example, the presence detector 480 may be a detector capable of detecting a human, for example, by infrared detection, motion detection, or other suitable means. In some exemplary embodiments, there may be regulations limiting the amount of power that a transmit antenna 414 may transmit at a specific frequency. In some cases, these regulations are meant to protect humans from electromagnetic radiation. However, there may be environments where a transmit antenna 414 is placed in areas not occupied by humans, or occupied infrequently by humans, such as, for example, garages, factory floors, shops, and the like. If these environments are free from humans, it may be permissible to increase the power output of the transmit antenna 414 above the normal power restrictions regulations. In other words, the controller 415 may adjust the power output of the transmit antenna 414 to a regulatory level or lower in response to human presence and adjust the power output of the transmit antenna 414 to a level above the regulatory level when a human is outside a regulatory distance from the electromagnetic field of the transmit antenna 414.

As a non-limiting example, the enclosed detector 460 (may also be referred to herein as an enclosed compartment detector or an enclosed space detector) may be a device such as a sense switch for determining when an enclosure is in a closed or open state. When a transmitter is in an enclosure that is in an enclosed state, a power level of the transmitter may be increased.

In exemplary embodiments, a method by which the transmitter 404 does not remain on indefinitely may be used. In this case, the transmitter 404 may be programmed to shut off after a user-determined amount of time. This feature prevents the transmitter 404, notably the driver circuit 424, from running long after the wireless devices in its perimeter are fully charged. This event may be due to the failure of the circuit to detect the signal sent from either the repeater or the receive antenna 218 that a device is fully charged. To prevent the transmitter 404 from automatically shutting down if another device is placed in its perimeter, the transmitter 404 automatic shut off feature may be activated only after a set period of lack of motion detected in its perimeter. The user may be able to determine the inactivity time interval, and change it as desired. As a non-limiting example, the time interval may be longer than that needed to fully charge a specific type of wireless device under the assumption of the device being initially fully discharged.

Figure 5:
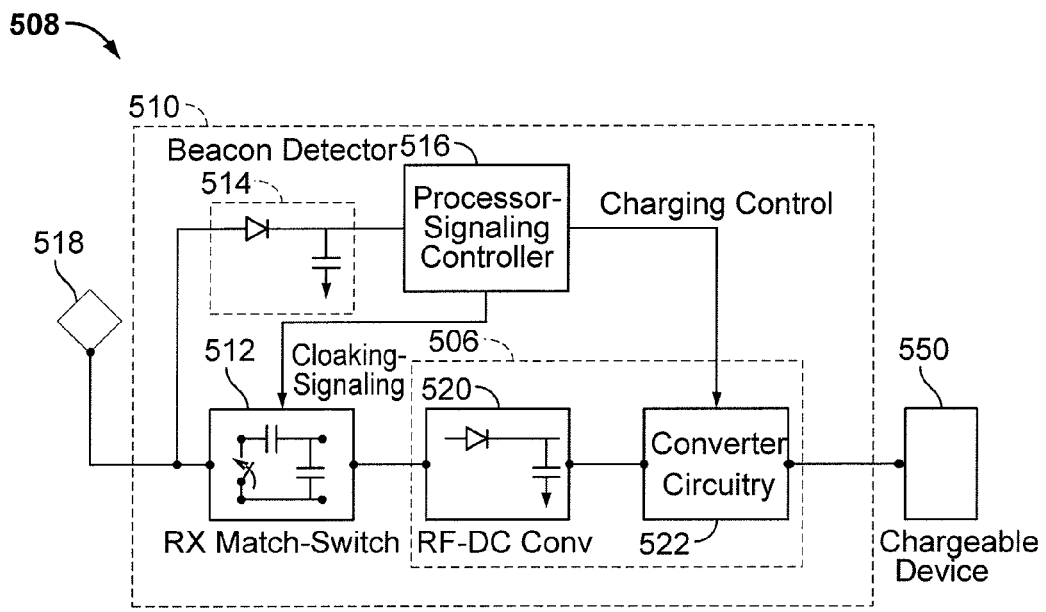
FIG. 5 is a functional block diagram of a receiver that may be used in the wireless power transfer system of FIG. 1, in accordance with an exemplary embodiment.

FIG. 5 is a functional block diagram of a receiver 508 that may be used in the wireless power transfer system of FIG. 1, in accordance with an exemplary embodiment. The receiver 508 includes receive circuitry 510 that may include a receive antenna 518. Receiver 508 further couples to chargeable device 550 for providing received power thereto. It should be noted that receiver 508 is illustrated as being external to chargeable device 550 but may be integrated into chargeable device 550. Energy may be propagated wirelessly to receive antenna 518 and then coupled through the rest of the receive circuitry 510 to chargeable device 550. By way of example, the charging device may include devices such as mobile phones, portable music players, laptop computers, tablet computers, computer peripheral devices, communication devices (e.g., Bluetooth devices), digital cameras, hearing aids (and other medical devices), and the like.

Receive antenna 518 may be tuned to resonate at the same frequency, or within a specified range of frequencies, as transmit antenna 414 (FIG. 4). Receive antenna 518 may be similarly dimensioned with transmit antenna 414 or may be differently sized based upon the dimensions of the associated chargeable device 550. By way of example, chargeable device 550 may be a portable electronic device having diametric or length dimension smaller than the diameter or length of transmit antenna 414. In such an example, receive antenna 518 may be implemented as a multi-turn coil in order to reduce the capacitance value of a tuning capacitor (not shown) and increase the receive coil's impedance. By way of example, receive antenna 518 may be placed around the substantial circumference of chargeable device 550 in order to maximize the antenna diameter and reduce the number of loop turns (i.e., windings) of the receive antenna 518 and the inter-winding capacitance.

Receive circuitry 510 may provide an impedance match to the receive antenna 518. Receive circuitry 510 includes power conversion circuitry 506 for converting a received RF energy source into charging power for use by the chargeable device 550. Power conversion circuitry 506 includes an RF-to-DC voltage converter 520 and may also include converter circuitry 522. An RF-to-DC voltage converter 520 rectifies the RF energy signal received at receive antenna 518 into a non-alternating power with an output voltage represented by $V_{rect}$. The converter circuitry 520 converts the rectified RF energy signal into an energy potential (e.g., voltage) that is compatible with chargeable device 550 with an output voltage and output current represented by $V_{out}$ and $I_{out}$. Various RF-to-DC voltage converters are contemplated, including partial and full rectifiers, regulators, bridges, doublers, as well as linear and switching converters.

Receive circuitry 510 may further include switching circuitry 512 for connecting receive antenna 518 to the power conversion circuitry 506 or alternatively for disconnecting the power conversion circuitry 506. Disconnecting receive antenna 518 from power conversion circuitry 506 not only suspends charging of chargeable device 550, but also changes the "load" as "seen" by the transmitter 404 (FIG. 2).

As disclosed above, transmitter 404 includes load sensing circuit 416 that may detect fluctuations in the bias current provided to transmitter driver circuit 424. Accordingly, transmitter 404 has a mechanism for determining when receivers are present in the transmitter's near-field.

When multiple receivers 508 are present in a transmitter's near-field, it may be desirable to time-multiplex the loading and unloading of one or more receivers to enable other receivers to more efficiently couple to the transmitter. A receiver 508 may also be cloaked in order to eliminate coupling to other nearby receivers or to reduce loading on nearby transmitters. This "unloading" of a receiver is also known herein as a "cloaking." Furthermore, this switching between unloading and loading controlled by receiver 508 and detected by transmitter 404 may provide a communication mechanism from receiver 508 to transmitter 404 as is explained more fully below. Additionally, a protocol may be associated with the switching that enables the sending of a message from receiver 508 to transmitter 404. By way of example, a switching speed may be on the order of 100 μsec.

In an exemplary embodiment, communication between the transmitter 404 and the receiver 508 refers to a device sensing and charging control mechanism, rather than conventional two-way communication (i.e., in band signaling using the coupling field). In other words, the transmitter 404 may use on/off keying of the transmitted signal to adjust whether energy is available in the near-field. The receiver may interpret these changes in energy as a message from the transmitter 404. From the receiver side, the receiver 508 may use tuning and de-tuning of the receive antenna 518 to adjust how much power is being accepted from the field. In some cases, the tuning and de-tuning may be accomplished via the switching circuitry 512. The transmitter 404 may detect this difference in power used from the field and interpret these changes as a message from the receiver 508. It is noted that other forms of modulation of the transmit power and the load behavior may be utilized.

Receive circuitry 510 may further include signaling detector and beacon circuitry 514 used to identify received energy fluctuations that may correspond to informational signaling from the transmitter to the receiver. Furthermore, signaling and beacon circuitry 514 may also be used to detect the transmission of a reduced RF signal energy (i.e., a beacon signal) and to rectify the reduced RF signal energy into a nominal power for awakening either un-powered or power-depleted circuits within receive circuitry 510 in order to configure receive circuitry 510 for wireless charging.

Receive circuitry 510 further includes processor 516 for coordinating the processes of receiver 508 described herein including the control of switching circuitry 512 described herein. Cloaking of receiver 508 may also occur upon the occurrence of other events including detection of an external wired charging source (e.g., wall/USB power) providing charging power to chargeable device 550. Processor 516, in addition to controlling the cloaking of the receiver, may also monitor beacon circuitry 514 to determine a beacon state and extract messages sent from the transmitter 404. Processor 516 may also adjust converter circuitry 522 for improved performance.

Although certain embodiments are discussed above, there are many additional ways to implement wireless power transfer in accordance with different embodiments. Various implementations of converter circuitry in accordance with select embodiments are discussed below.

Converter Circuitry

Typically, a wireless receiver can be subject to a wide input voltage range due to the variability of mutual inductance between a transmitter and receiver. However, the output voltage of the receiver can be constrained to a limited voltage range as dictated by a device charged using the receiver. This limited voltage range is typically a smaller voltage range than the voltage range of the rectified voltage received wirelessly from a transmitter. A DC-to-DC down or buck converter can be utilized to convert a higher voltage level to a lower voltage level in a receiver. However, a DC-to-DC converter typically adds significant losses to the system.

In particular embodiments, converter circuitry 522 can adapt to subsequent conversion stage voltage tolerance compatibility to increase the efficiency of the converter circuitry 522. For example, converter circuitry 522 can adapt to subsequent conversion stage voltage tolerance compatibility by operating intelligently based upon a relationship between the input voltage and a first voltage level threshold.

In select embodiments, converter circuitry 522 can be implemented as part of the power management integrated circuitry (PMIC) in a receiver used to charge a chargeable device. Thereby, the PMIC can use converter circuitry 522 to intelligently convert DC voltages as needed for different applications of the PMIC.

In certain embodiments, converter circuitry 522 can produce a different output voltage dependent upon the value of the input voltage relative to a first voltage level threshold. For example, when the value of the input voltage is above a first voltage level threshold, the converter circuitry 522 can process the input voltage to produce an output voltage that is scaled to a reduced value relative to the input voltage, scaled to a greater value relative to the input voltage or scaled to a same value relative to the input voltage. Furthermore, when the value of the input voltage is at or below a first voltage level threshold, the converter circuitry 522 can process the input voltage to produce an output voltage that is scaled to a reduced value relative to the input voltage, scaled to a greater value relative to the input voltage or scaled to a same value relative to the input voltage. In certain embodiments, an output voltage that is scaled to a same value relative to the input voltage can be accomplished by directly connecting the input of the converter circuitry 522 to the output of the converter circuitry. Alternatively, an output voltage that is scaled to a same value relative to the input voltage can be produced without directly connecting the input of the converter circuitry 522 to the output of the converter circuitry 522.

In particular embodiments, converter circuitry 522 can produce different output voltages by being configured to multiply the input voltage by a scaling factor equal to a rational number. As a non-limiting example, converter circuitry 522 can produce different output voltages by multiplying the input voltage by a scaling factor of ½ to produce an output voltage that is scaled to a reduced value relative to the input voltage. As another non-limiting example, converter circuitry 522 can produce different output voltages by multiplying the input voltage by a scaling factor of 3 to produce an output voltage that is scaled to an increased value relative to the input voltage. As another non-limiting example, converter circuitry 522 can produce different output voltages by multiplying the input voltage by a scaling factor of 1 to produce an output voltage that is scaled to a same value relative to the input voltage. In various embodiments, a scaling factor for when an output voltage is scaled to a reduced value relative to the input voltage can be different than a scaling factor for when an output voltage is scaled to an increased value relative to the input voltage. Although specific scaling factors are discussed herein, any scaling factor can be used in accordance with different embodiments in different applications.

In certain embodiments, the operation of converter circuitry 522 processes the input voltage such that the output voltage is limited to a value below a second voltage level threshold. For example, in certain embodiments, an input of the converter circuitry 522 can receive a rectified voltage derived from a receive antenna 518 (FIG. 5). The voltage from the rectifier circuit may span a large range of voltages. As a non-limiting example, the voltage may span from substantially 5V to substantially 20V. The converter circuitry 522 can process the input voltage (the rectified voltage) such that the voltage at the output of the converter circuitry 522 is a scaled version of the input voltage. In particular embodiments, the converter circuitry 522 can operate to scale the input voltage when the input voltage is above a first voltage level threshold such that the output voltage is half of the value of the value of the input voltage. For example, if the input voltage from the rectifier is from 5V to 20V, then the output voltage can be within a range of 5V to 10V.

In specific embodiments, the converter circuitry 522 can include a configuration that increases the output voltage relative to the input voltage. This can occur by scaling up the output voltage based upon the value of the input voltage relative to the first voltage level threshold. In certain embodiments, scaling can occur when the input voltage is at or lower than the first voltage level threshold. For example, if the input voltage from the rectifier is from 2.5V to 10V, then the output voltage may be scaled to be within a range of 5V to 10V. Alternatively, scaling can occur when the input voltage is above the first voltage level threshold. In certain embodiments, converter circuitry 522 that increases an output voltage relative to an input voltage can be implemented by reversing the circuitry of converter circuitry 522 (such as but not limited to charge pump circuitry discussed further below) that decreases an output voltage relative to an input voltage.

Figure 6:
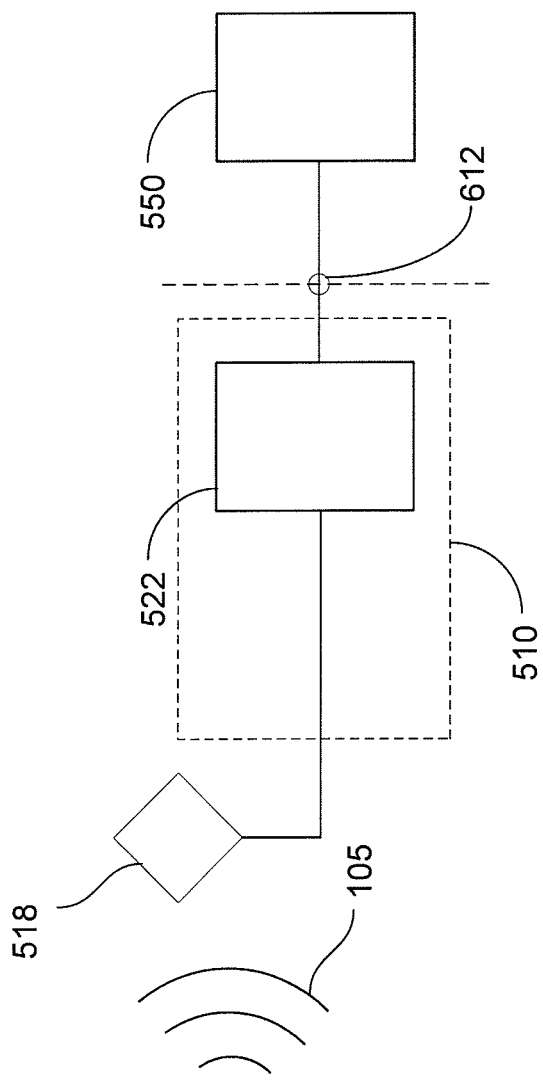
FIG. 6 is a functional block diagram with a receiver that utilizes converter circuitry that may be used in the wireless power transfer system of FIG. 1, in accordance with an exemplary embodiment.

A simplified version of the block diagram of FIG. 5 with a receiver that utilizes converter circuitry 522 in accordance with an exemplary embodiment is illustrated in FIG. 6. The receiver includes a receive antenna 518 coupled with converter circuitry 522 as part of the receiver's receive circuitry 510. The receive antenna 518 can be configured to wirelessly receive power transferred via an energy field 105 from a transmitter at a level sufficient for charging a chargeable device 550. In certain embodiments, the receiver can interface with a chargeable device 550 at an interface node 612 where an output of the receive circuitry is connected with an input of the chargeable device 550 for charging the chargeable device. In particular embodiments, the output of the receive circuitry 510 is the output of the converter circuitry 522. In certain embodiments, the receiver can be configured to be integrated within the structure of a chargeable device. Converter circuitry 522 of the receive circuitry 510 can receive an input voltage derived from the wirelessly received power 105 and produce an output voltage that is scaled to a value of the input voltage based upon the relationship between the input voltage and the first voltage level threshold. In certain embodiments, the output voltage can be scaled to a reduced value of the input voltage when the input voltage is above the first voltage level threshold, or alternatively when the input voltage is at or below the first voltage level threshold. In additional embodiments, the output voltage can be scaled to an increased value of the input voltage when the input voltage is above the first voltage level threshold, or alternatively when the input voltage is at or below the first voltage level threshold.

In accordance with the above, in one non-limiting embodiment, the converter circuitry 522 is configured to operate in a first mode (e.g., a "by-pass" mode) where the voltage at the output of the converter circuitry 522 is substantially equal to the voltage at the input to the converter circuitry 522 for a certain range of input voltages. Stated another way, the converter circuit 522 may be configured to provide a low DC resistance path between the input and output in a range of input voltages in which there is a compatibility between the rectified voltage and the voltage accepted by the chargeable device 550. In this mode the efficiency of the converter circuit may be close to 100%. In addition to the first mode, the converter circuitry 522 is configured to operate in a second mode (e.g., "divide by 'X' mode") where the voltage at the output of the converter circuitry 522 is scaled, by a substantially constant value, to a reduced value relative to the voltage at the input of the converter circuitry 522 (e.g., reduced by ½). In this second mode, the efficiency of the converter circuitry 522 is still maintained at high level based on the straight scaling operation as opposed to having to convert a wide range of input voltages to a single fixed output voltage. While the voltage at the output of the converter circuitry 522 may have some variation, the amount of variation may be acceptable to the chargeable device 550 and the efficiency of the converter circuitry 522 is maintained high. In an aspect this may allow a wireless power receiver to more efficiently provide power even while coping with a significantly wide voltage range due to, for example, variability of the mutual inductance between the transmitter and the receiver.

In particular embodiments, operation of converter circuitry 522 can be configured by the chargeable device 550. A chargeable device 550 can configure any aspect of the operation of converter circuitry 522 for different applications in accordance with different embodiments, including but not limited to what the first voltage level threshold can be set at, the voltage level that the converter circuitry 522 should be configured to produce, the range in which output voltage can be scaled within, and the scaling factor by which different output voltages can be produced by multiplying the input voltage by the scaling factor. The chargeable device 550 can set any aspect of the operation of converter circuitry 522 by communicating the configuration for the aspect of the operation of converter circuitry 522 to the converter circuitry 522. In certain embodiments, an aspect of operation of converter circuitry 522 can be set by over-voltage protection circuitry and/or under-voltage detection circuitry of the chargeable device 550. The over-voltage protection and under-voltage detection circuitry can be any circuitry on a chargeable device 550 configured to manage the voltage, current or power input to the chargeable device 550 (e.g., over-voltage protection or under-voltage detection circuitry at a charge port where the chargeable device 550 is accepting power).

In select embodiments, converter circuitry 522 can be implemented in a scalable manner as multiple tile circuits implemented in parallel. The tile circuits can be configured in a master-slave configuration, where a master tile circuit dictates the operation of at least one slave tile circuit and the combination of the master and slave tile circuits operates as the converter circuitry 522. In certain embodiments, implementation of converter circuitry 522 as multiple tile circuits enables increased power handing for different power levels in accordance with different applications (such as but not limited to charging different devices). In particular embodiments, different tiles can be clocked by differently phased clock circuits. In certain embodiments, ripple and noise can be lessened when different tiles are clocked by differently phased clock circuits.

Figure 7:
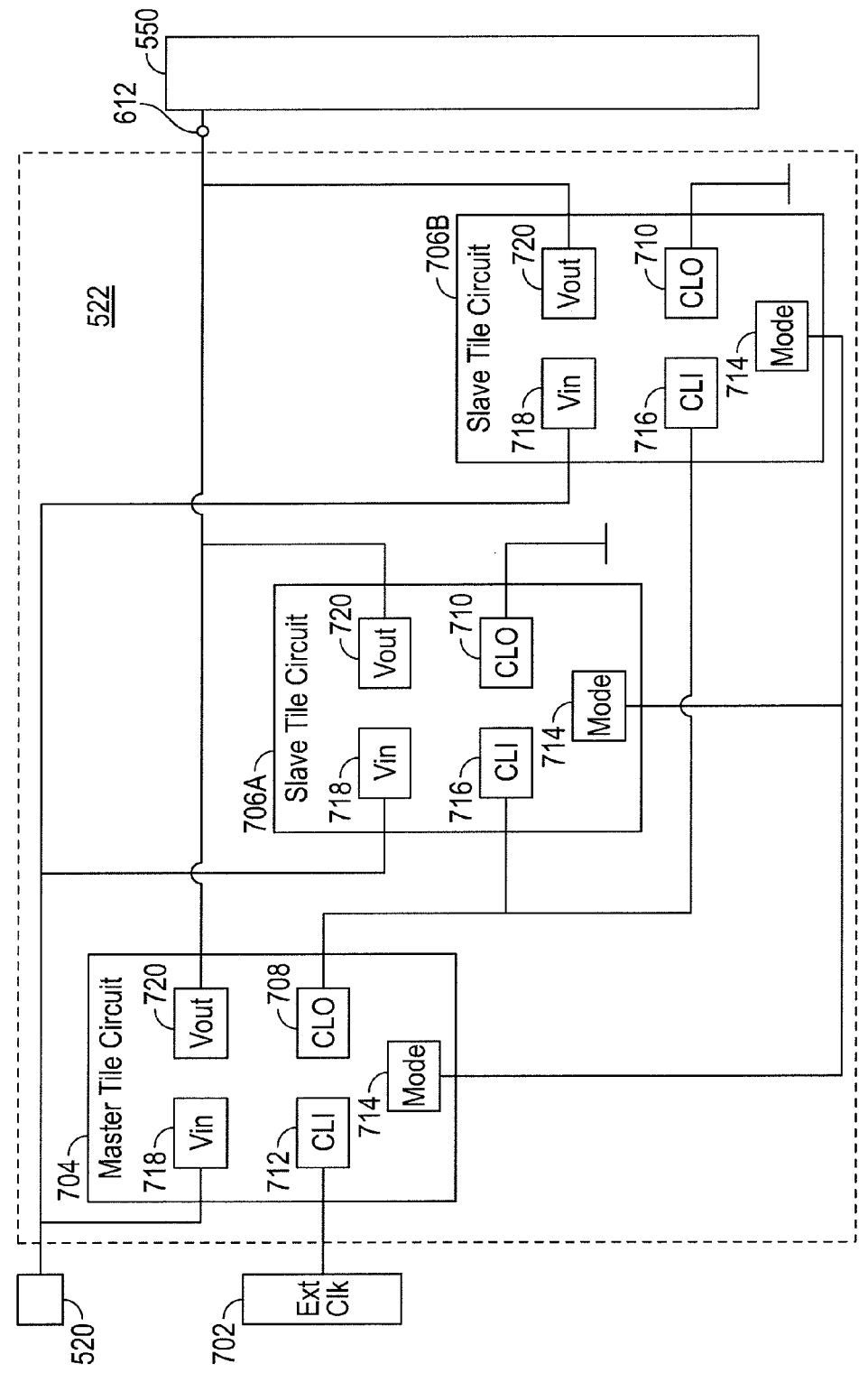
FIG. 7 is a block diagram of the converter circuitry of FIG. 6 implemented as multiple tile circuits in accordance with an exemplary embodiment

FIG. 7 is a block diagram of the converter circuitry 522 of FIG. 6 implemented as multiple tile circuits in accordance with an exemplary embodiment. In the illustrated embodiment, the converter circuitry 522 includes a master tile circuit 704 and slave tile circuits 706A, 706B. The converter circuitry 522 receives an input voltage from the rectifier 520 and generates an output voltage fed to the chargeable device 550 via the interface node 612 that is at both the output of the receive circuitry 522 and input of the chargeable device 550.

In certain embodiments, the master tile circuit 704 dictates the operation of the slave tile circuits 706A, 706B. The slave tile circuits 706A, 706B can be assigned to a "slave" designation by setting a clock output port 710 of the slave tile circuit to a particular voltage level (such as but not limited to ground). Similarly, the master tile circuit 704 can be assigned to a "master" designation by not setting a clock output port of the master tile circuit 708 to the particular voltage level used to designate a slave tile circuit (such as but not limited to ground). Each of the tile circuits can be driven by a clock signal determined by an external clock 702. In particular embodiments, the slave tiles can be configured to use a different phase of the clock signal from that utilized by the master tile. In certain embodiments, slave tiles can be configured to use a different phase of the clock signal from that utilized by the master tile to lessen output ripple and noise. The external clock 702 can be connected to the clock input port 712 of the master tile circuit to drive the master tile circuit with the clock signal. The master tile circuit 704 can then operate according to the clock signal and also drive the slave tile circuits 706A, 706B to operate according to the clock signal via the connection between the master tile circuit's clock output port and the slave tile circuit's clock input port 716. Although the external clock 702 is presented in the illustrated embodiment as being external to the converter circuitry 522, the external clock can be implemented in any manner, such as but not limited to being part of the converter circuitry 522 or internal to a tile circuit (such as but not limited to a master tile circuit 704).

In certain embodiments, an operational mode of the converter circuit 522 can be synchronized across each of the tile circuits of the converter circuit 522 and be controlled by the master tile circuit 704. The master tile circuit 704 can control the operational mode of the slave tile circuits 706A, 706B via a connection between the mode port of each of the tile circuits. The types of modes can include the way that the converter circuitry 522 receives an input voltage and produces an output voltage that is scaled to a value of the input voltage based on the relationship between the input voltage and the first voltage level threshold. Certain examples of modes can include modes of producing an output voltage that is scaled to: a reduced value of the input voltage, an increased value of the input voltage or the same value as the input voltage of the converter circuitry 522.

In select embodiments, each of the tile circuits 704, 706A, 706B receives the input voltage of the converter circuitry 522 via each respective voltage input port 718. Also, each of the tile circuits 704, 706A, 706B can produce an output voltage via each respective voltage output port 720, which is also the output voltage of the converter circuitry 522. Each tile circuit 704, 706A, 706B can produce output voltage at the same voltage level. However, each tile circuit 704, 706A, 706B produces its output voltage along with a particular amount of current. Therefore, the power presented at the output of the converter circuitry 522 can be increased based upon the amount of current produced by the combination of the tile circuits 704, 706A, 706B of the converter circuitry 522 (which each produces an output voltage at the same voltage level). For example, in certain embodiments power output by the converter circuitry 522 can be increased by increasing the number of tile circuits used by the converter circuitry 522.

In particular embodiments, converter circuitry 522 can be implemented as charge pump circuitry. Charge pump circuitry can be implemented to convert DC voltages from one voltage level to another voltage level using capacitors as energy storage elements. In a number of embodiments, converter circuitry 522 can be implemented as charge pump circuitry in any manner for receiving an input voltage and producing an output voltage that is scaled to a value of the input voltage based on the relationship between the input voltage and a first voltage level threshold. Certain non-limiting examples of how the converter circuitry 522 can be implemented as charge pump circuitry can include (but is not limited to) where all tile circuits can be implemented as charge pump circuitry, where the converter circuitry 522 can be implemented as a single tile circuit of charge pump circuitry, or where the converter circuitry 522 is partially implemented as charge pump circuitry.

Figure 8:
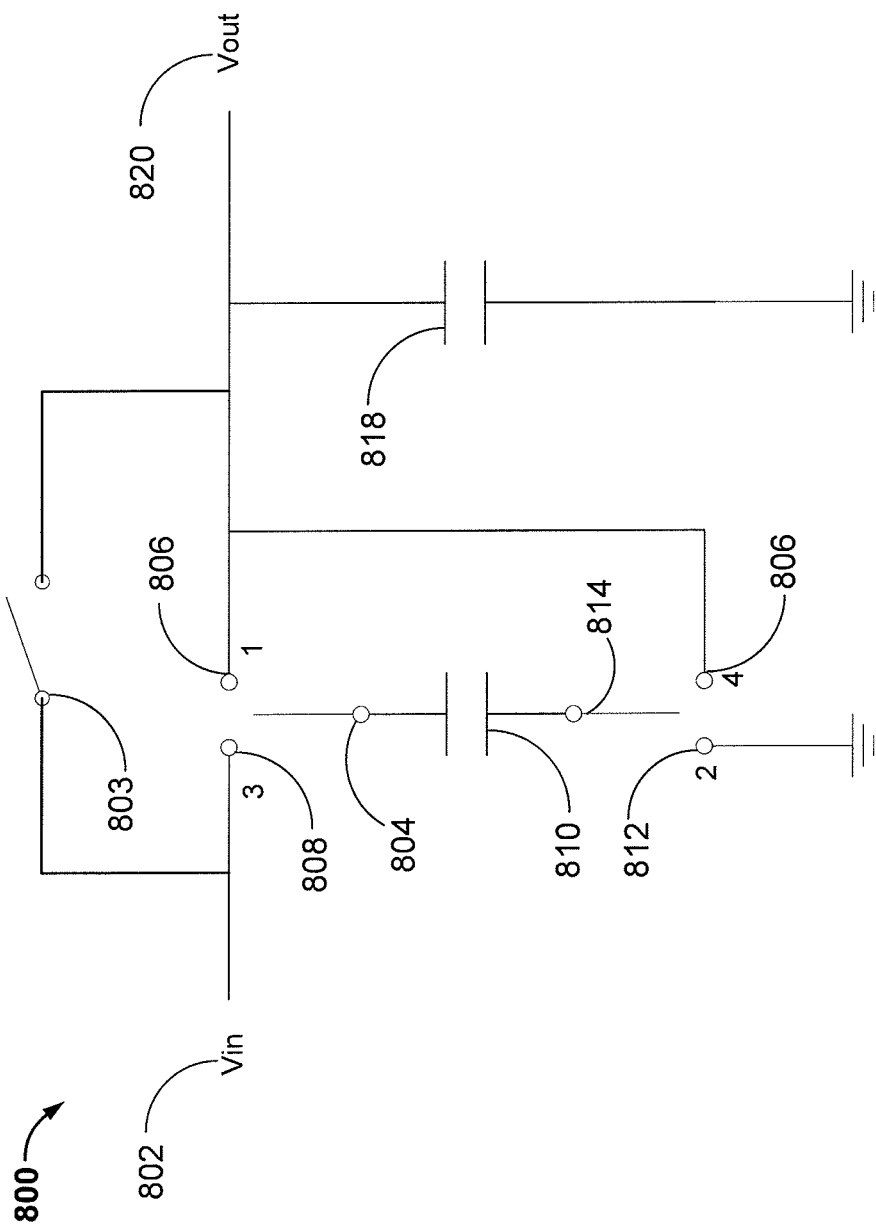
FIG. 8 is a schematic diagram of converter circuitry implemented as charge pump circuitry that can be used in the receivers of FIGS. 5 and 6 in accordance with an exemplary embodiment.

FIG. 8 is a schematic diagram of converter circuitry 522 implemented as charge pump circuitry that can be used in the receiver of FIG. 6 in accordance with an exemplary embodiment. The charge pump circuitry 800 can be configured to receive an input voltage 802 at an input to the charge pump circuitry 800 derived from the wirelessly received power. The charge pump circuitry can also produce an output voltage 820 at an output of the charge pump circuitry 800 that is scaled to a reduced value of the input voltage when the input voltage is above a first voltage level threshold. The charge pump circuitry 800 can include a first switch 803, a second switch 804, and a third switch 814. When the input voltage is at or below a first voltage level, the first switch 803 is closed and both the second switch 804 and the third switch 814 can operate in a first mode where the first switch 804 is connected to a first node 806 and the second switch 814 is connected to a second node 812. When the input voltage is above the first voltage level threshold, the first switch 803 is open and both the second switch 804 and third switch 814 can operate in a second mode where the first switch 804 is alternately connected to a first node 806 or to a third node 808 and the second switch 814 is alternately connected to a second node 812 or to a fourth node 806 The operation of the charge pump circuitry 800 in the first mode enables the charge pump circuitry 800 to directly connect the input voltage 802 of the charge pump circuitry 800 to the output voltage 820 of the charge pump circuitry 800. Similarly, the operation of the charge pump circuitry 800 in the second mode configures the charge pump circuitry 800 to receive an input voltage 802 derived from the wirelessly received power and produce an output voltage 820 that is scaled to a reduced value of the input voltage 802 when the input voltage 802 is above a first voltage level threshold.

In certain embodiments, the scaled value of the output voltage 820 is half of the value of the input voltage 802. In the second mode, a first capacitor 810 with a first end alternately coupled to the input voltage 802 or the output voltage 820 and a second end alternately coupled to the output voltage 820 or ground is utilized to produce an output voltage 820 that is scaled to a reduced value of the input voltage 802. In certain embodiments, a second capacitor 818 can be coupled between the output voltage 820 and ground to store the output voltage 820 at the output to the charge pump circuitry 800 and reduce the voltage noise generated by the charge pump. In certain embodiments, the properties and configuration of the components that make up the charge pump circuitry 800 can be modified to achieve different scaling for the output voltage as a reduced value of the input voltage (or as an increased value of the input voltage when the charge pump circuitry is implemented in reverse). As described above, in one aspect, the efficiency of operating the charge pump circuitry 800 in the first mode that directly connects the input voltage 802 to the output voltage 820 may be close to 100%. In addition, the efficiency of operating the charge pump circuitry 800 in the second mode may also be very high as regardless of the value of the input voltage. This is because the output voltage is simply scaled by a constant pre-determined or programmed value. As the interface to the chargeable device 550 (FIG. 6) may accept a somewhat wide voltage range, some variability of the output voltage 820 may be acceptable making it compatible for use with the charge pump circuitry 800 that may provide very high efficiency DC-DC conversion. This may allow increased efficiency for wirelessly received power that may vary as described above due to, for example, variability of the mutual inductance between the transmitter and receiver.

Figure 9:
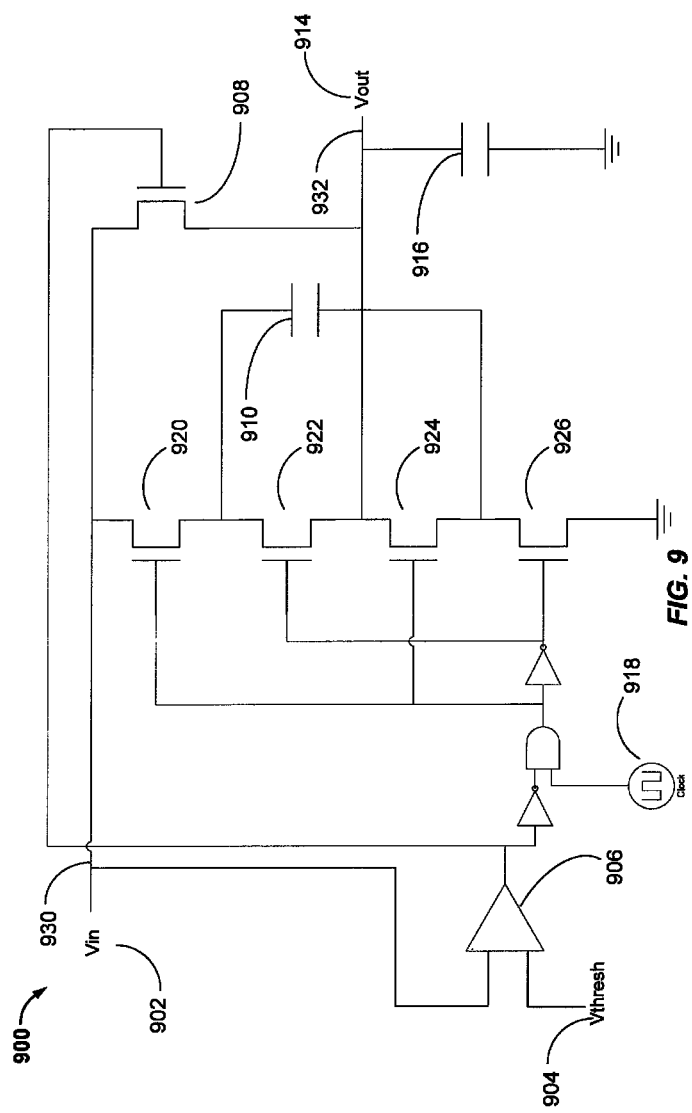
FIG. 9 is a schematic diagram of converter circuitry implemented as charge pump circuitry with comparators that can be used in the receivers of FIGS. 5 and 6 in accordance with an exemplary embodiment.

A schematic diagram of charge pump circuitry implemented with comparators that can be used in the receiver of FIG. 6 in accordance with an exemplary embodiment is illustrated in FIG. 9. The charge pump circuitry 900 utilizes a first comparator 906 that compares the input voltage 902 with a first voltage level threshold 904 to operate a first transistor 908 that enables the input voltage 902 to pass to the output when the input voltage is at or lower than the first voltage level threshold 904. When the input voltage is higher than the first voltage level threshold 904, the comparator 906 disables transistor 908 and enables the clock signal 918 to pass through and operate alternately transistors (920, 924) and (922, 926) to transfer charge from input voltage node 930 to output node 932, and provide at the output a scaled down voltage relative to Vin.

Although various circuit topographies for converter circuits (and converter circuits implemented as charge pump circuitry) are discussed above, different circuit topographies can be utilized with different circuit components in different configurations in the implementation of converter circuits in accordance with certain embodiments.

Figure 10:
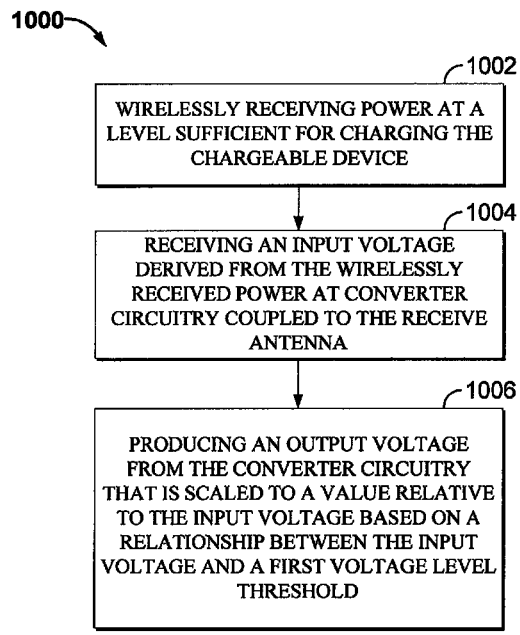
FIG. 10 is a flowchart of an exemplary process for applying converter circuitry to produce an output voltage in accordance with an exemplary embodiment.

FIG. 10 is a flowchart of an exemplary process for applying converter circuitry 522 to produce an output voltage in accordance with exemplary embodiments. In certain embodiments, the process 1000 can be performed by a receiver. Although the process in FIG. 10 is illustrated in a particular order, in certain embodiments the blocks herein may be performed in a different order, simultaneously, or omitted, and additional blocks can be added. A person of ordinary skill in the art will appreciate that the process of the illustrated embodiment may be implemented in any receiver that can be configured to charge or supply power to a chargeable device via the wireless transfer of power.

At block 1002, power can be wirelessly received by a receiver at a level sufficient for charging of a chargeable device. At block 1004, an input voltage derived from the wirelessly received power at converter circuitry coupled to the receive antenna can be received. At block 1006, an output voltage can be produced from the converter circuitry that is scaled to a value relative to the input voltage based on a relationship between the input voltage and a first voltage level threshold.

Figure 11:
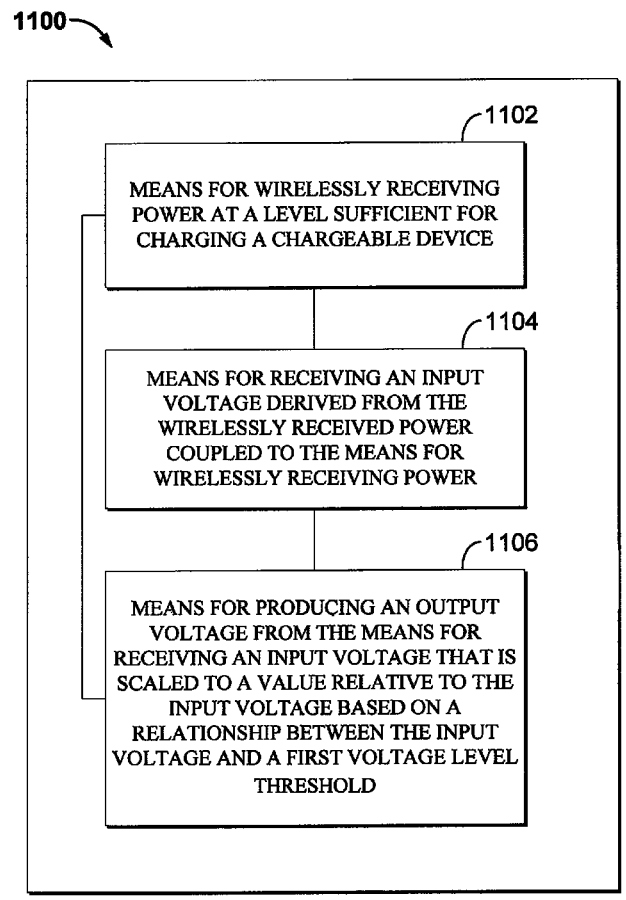
FIG. 11 is a functional block diagram of a receiver in accordance with an exemplary embodiment.

FIG. 11 is a functional block diagram of a receiver, in accordance with an exemplary embodiment. The receiver 1100 comprises means 1102, means 1104 and means 1106 for the various actions discussed with respect to FIGS. 1-10. The receiver 1100 includes means 1102 for wirelessly receiving power at a level sufficient for charging a chargeable device. In an embodiment, means 1102 for wirelessly receiving power can be configured to perform one or more of the functions discussed above with respect to block 1002. In various embodiments, the means 1102 for wirelessly receiving power can be implemented by the receiver coil 518 (FIGS. 5 and 6).

The receiver 1100 further includes means 1104 for receiving an input voltage derived from the wirelessly received power coupled to the means for wirelessly receiving power. In an embodiment, means 1104 for receiving an input voltage may be configured to perform one or more of the functions discussed above with respect to block 1004. In various embodiments, the means 1104 for receiving an input voltage can be implemented by receive circuitry 510 (FIGS. 5 and 6).

The receiver 1100 further includes means 1106 for producing an output voltage from the means for receiving an input voltage that is scaled to a value relative to the input voltage based on a relationship between the input voltage and a first voltage level threshold. In an embodiment, means 1106 for producing an output voltage may be configured to perform one or more of the functions discussed above with respect to block 1006. In various embodiments, the means 1106 for producing an output voltage can be implemented by converter circuitry 522 (FIGS. 5 and 6).

Figure 12:
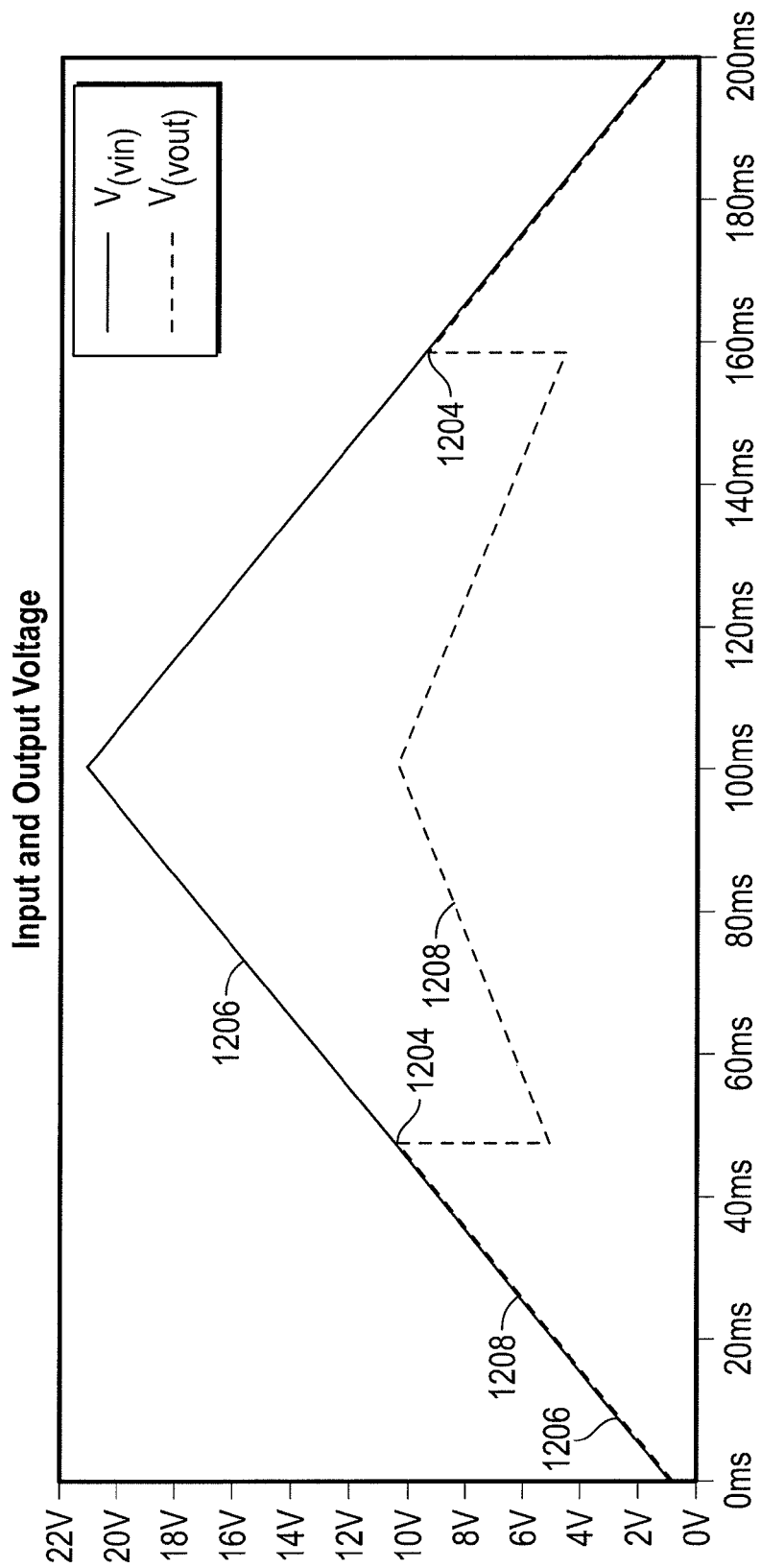
FIG. 12 is a plot of exemplary input and output voltages of converter circuitry in accordance with an exemplary embodiment.

A plot of the input and output voltages of converter circuitry in accordance with an exemplary embodiment is illustrated in FIG. 12. The plot illustrates how both input voltage 1206 and output voltages 1208 are plotted with respect to time. As illustrated, when the input voltage 1206 is below a first voltage level threshold 1204 (10V in the illustrated embodiment), the input voltage 1206 and output voltage 1208 are the same. When the input voltage 1206 is above the first voltage level threshold 1204, the output voltage 1208 is scaled to a reduced value of the input voltage 1206 (½ of the input voltage level in the illustrated embodiment).

Although certain embodiments are discussed above, there are many additional ways to implement converter circuitry in accordance with different embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and blu ray disc where disks usually reproduce data magnetically, while discs reproduce data optically with lasers. Combinations of the above should also be included within the scope of computer readable media. The processor and the storage medium may reside in an ASIC. The ASIC may reside in a user terminal. In the alternative, the processor and the storage medium may reside as discrete components in a user terminal.

For purposes of summarizing the disclosure, certain aspects, advantages and novel features of certain embodiments have been described herein. It is to be understood that not necessarily all such advantages may be achieved in accordance with any particular embodiment. Thus, the embodiments may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the application. Thus, the present application is not intended to be limited to the embodiments shown herein but is to be accorded the widest scope consistent with the principles and novel features disclosed herein.

What is claimed is:

1. A wireless power receiver apparatus for charging a chargeable device, comprising:
   a receive antenna configured to wirelessly receive power at a level sufficient for charging the chargeable device; and
   converter circuitry coupled to the receive antenna, the converter circuitry configured to:
      receive an input voltage, at an input of the converter circuitry, derived from the wirelessly received power;
      operate in a first mode to produce a first output voltage, at an output of the converter circuitry, that is substantially equal to the input voltage based on a first relationship between the input voltage and a first voltage level threshold; and
      operate in a second mode to produce a second output voltage, at the output of the converter circuitry, that is scaled to a value relative to the input voltage based on a second relationship between the input voltage and the first voltage level threshold.

2. The receiver of claim 1, wherein the first voltage level threshold is set at least in part by over-voltage protection circuitry or under-voltage detection circuitry of the chargeable device.

3. The receiver of claim 1, wherein the converter circuitry is configured to produce the second output voltage limited to a value below a second voltage level threshold.

4. The receiver of claim 3, wherein the first voltage level threshold is a scaled value of the second voltage level threshold.

5. The receiver of claim 4, wherein the first voltage level threshold is half of the value of the second voltage level threshold.

6. The receiver of claim 1, wherein the converter circuitry is configured to selectively produce the second output voltage that is scaled to a value that is half of the input voltage.

7. The receiver of claim 1, wherein the converter circuitry comprises charge pump circuitry configured to produce the second output voltage that is scaled to a value relative to the input voltage.

8. The receiver of claim 7, wherein the charge pump circuitry comprises a comparator circuit configured to compare an input voltage to the first voltage level threshold and configures the charge pump circuitry to produce the second output voltage that is scaled to a value relative to the input voltage.

9. The receiver of claim 8, wherein the charge pump circuitry is configured to multiply the input voltage by a scaling factor equal to a rational number.

10. The receiver of claim 9, wherein the scaling factor for when the input voltage is above the first voltage level threshold is different than the scaling factor for when the input voltage is at or below the first voltage level threshold.

11. The receiver of claim 1, wherein the converter circuitry includes a master circuit and at least one slave circuit, where the at least one slave circuit is synchronized to a clock signal of the master circuit.

12. The receiver of claim 11, wherein each of the master circuit and at least one slave circuit comprises charge pump circuitry configured to produce the second output voltage that is scaled to a value relative to the input voltage.

13. The receiver of claim 12, wherein the master circuit comprises a comparator circuit configured to compare an input voltage to the first voltage level threshold and configures the master circuit and the at least one slave circuit to produce the second output voltage that is scaled to a value relative to the input voltage.

14. The receiver of claim 13, wherein each of the master circuit and at least one slave circuit is configured to multiply the input voltage by a scaling factor equal to a rational number.

15. The receiver of claim 14, wherein a scaling factor for when the input voltage is above the first voltage level threshold is different than a scaling factor for when the input voltage is at or below the first voltage level threshold.

16. A wireless power receiver apparatus for charging a chargeable device, comprising:
   means for wirelessly receiving power at a level sufficient for charging the chargeable device;
   means for receiving an input voltage derived from the wirelessly received power coupled to the means for wirelessly receiving power;
   means for producing a first output voltage from the means for receiving an input voltage that is substantially equal to the input voltage based on a first relationship between the input voltage and a first voltage level threshold; and
   means for producing a second output voltage from the means for receiving an input voltage that is scaled to a value relative to the input voltage based on a second relationship between the input voltage and the first voltage level threshold.

17. The receiver of claim 16, wherein the first voltage level threshold is set at least in part by over-voltage protection circuitry or under-voltage detection circuitry of the chargeable device.

18. The receiver of claim 16, wherein the means for producing the second output voltage is configured to produce the second output voltage limited to a value below a second voltage level threshold.

19. A method for charging a chargeable device, comprising:
   wirelessly receiving power at a level sufficient for charging the chargeable device at a receive antenna;

receiving an input voltage derived from the wirelessly received power at converter circuitry coupled to the receive antenna;

producing a first output voltage from the converter circuitry that is substantially equal to the input voltage based on a first relationship between the input voltage and a first voltage level threshold; and producing a second output voltage from the converter circuitry that is scaled to a value relative to the input voltage based on a second relationship between the input voltage and the first voltage level threshold.

20. The method of claim 19, wherein the first voltage level threshold is set at least in part by over-voltage protection circuitry or under-voltage detection circuitry of the chargeable device.

21. The method of claim 19, wherein the converter circuitry is configured to produce the second output voltage limited to a value below a second voltage level threshold.

22. The method of claim 21, wherein the first voltage level threshold is a scaled value of the second voltage level threshold.

23. The method of claim 22, wherein the first voltage level threshold is half of the value of the second voltage level threshold.

24. The method of claim 19, wherein the converter circuitry is configured to produce the second output voltage that is scaled to a value that is half of the input voltage.

25. The method of claim 19, wherein the converter circuitry comprises charge pump circuitry configured to produce the second output voltage that is scaled to a value relative to the input voltage.

26. The method of claim 25, wherein the charge pump circuitry comprises a comparator circuit configured to compare an input voltage to the first voltage level threshold and configures the charge pump circuitry to produce the second output voltage that is scaled to a value relative to the input voltage.

27. The method of claim 26, wherein the charge pump circuitry is configured to multiply the input voltage by a scaling factor equal to a rational number.

28. The method of claim 27, wherein a scaling factor for when the input voltage is above the first voltage level threshold is different than a scaling factor for when the input voltage is at or below the first voltage level threshold.

29. The method of claim 19, wherein the converter circuitry includes a master circuit and at least one slave circuit, where the at least one slave circuit is synchronized to a clock signal of the master circuit.

30. The method of claim 29, wherein each of the master circuit and at least one slave circuit comprises charge pump circuitry configured to produce the second output voltage that is scaled to a value relative to the input voltage.

* * * * *